Dec. 6, 1966
J. A. COMPTON
3,289,601
FLUID DISPLACEMENT DEVICE USABLE AS A HYDRAULIC MOTOR OR PUMP
Filed Feb. 12, 1965
3 Sheets-Sheet 2
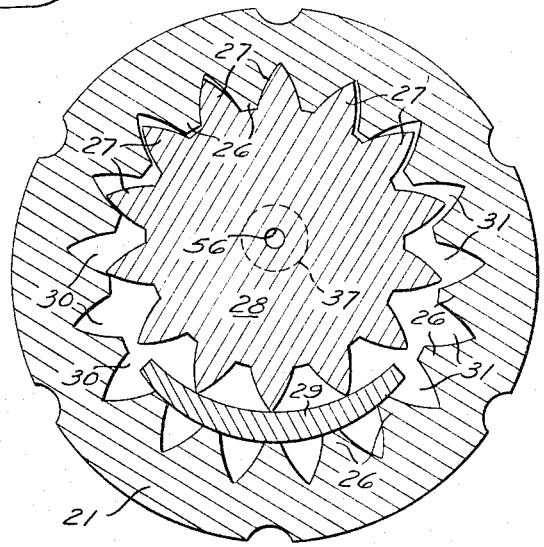
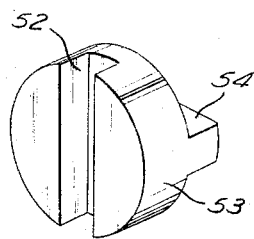
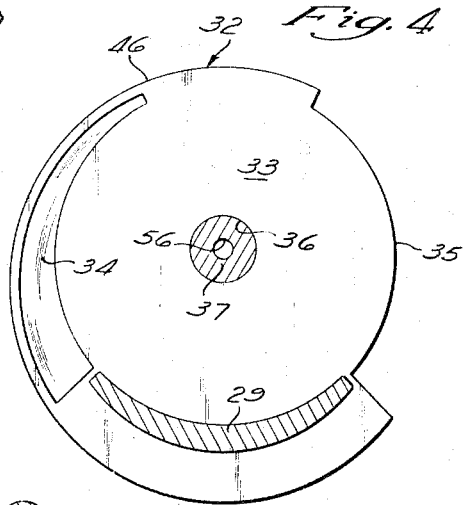
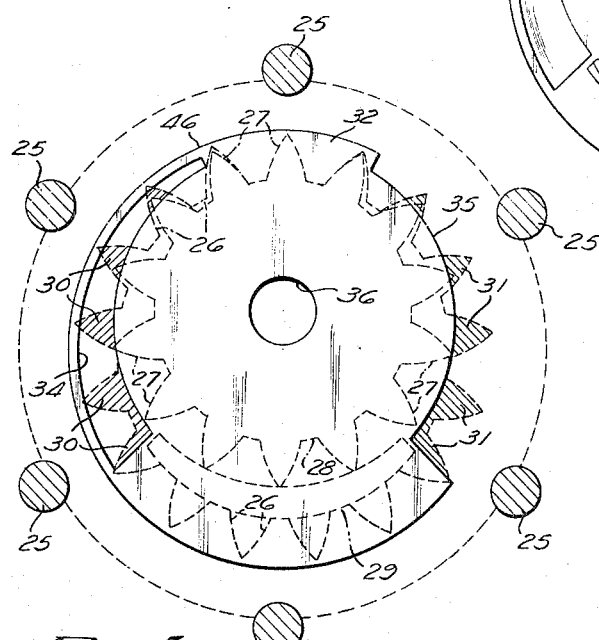
INVENTOR.
JAMES A. COMPTON
BY
Ely, Golrick + Flynn
ATTORNEYS

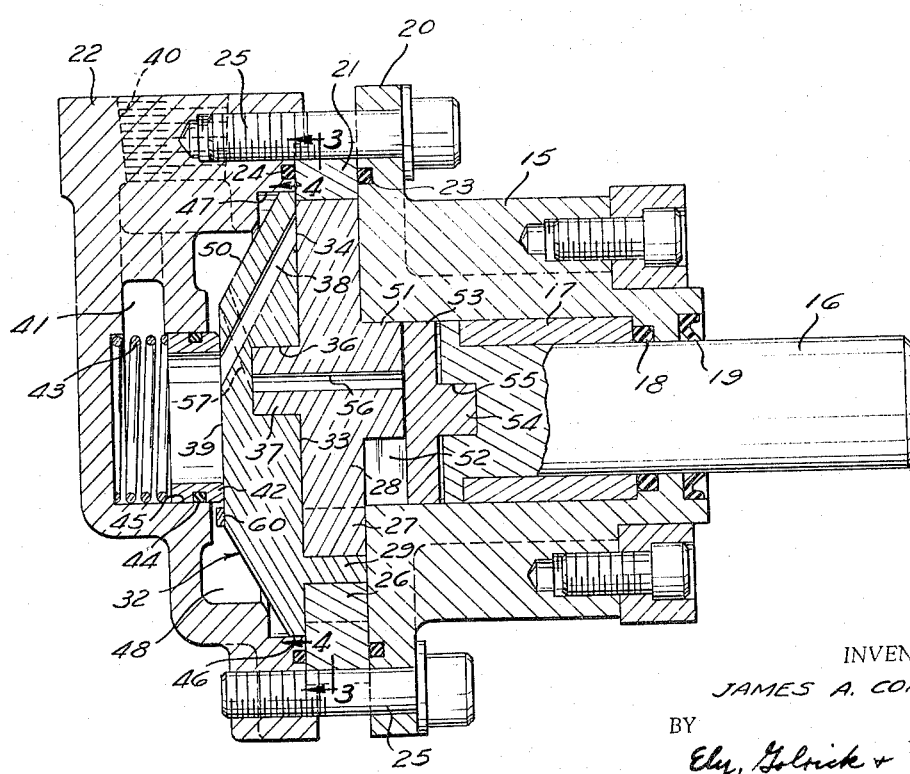

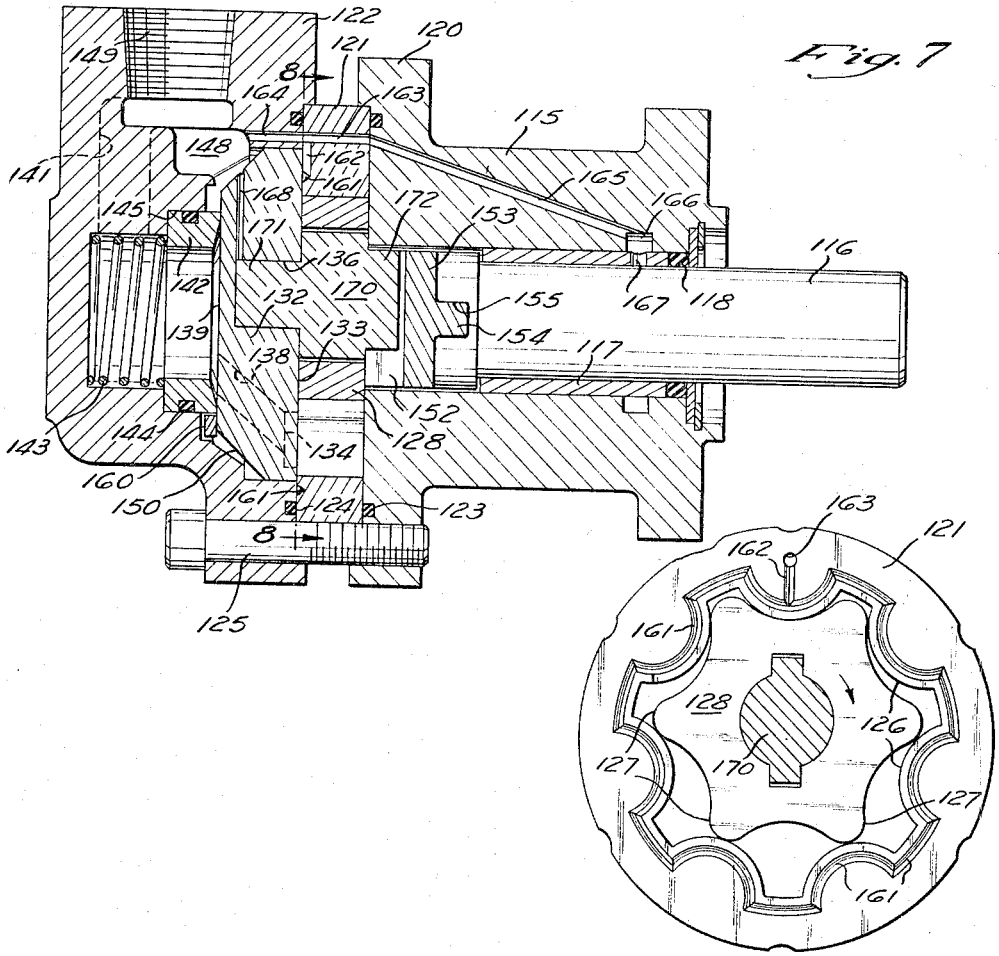
Fig. 7
Fig. 8
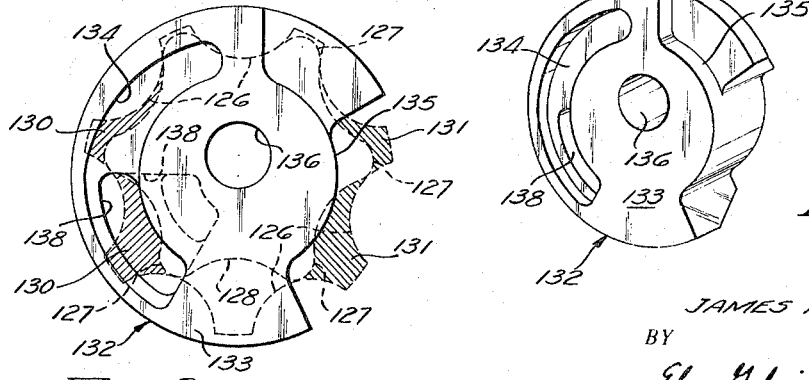
Fig. 9
Fig. 10
INVENTOR.
JAMES A. COMPTON
BY
Ely, Golrick + Flynn
ATTORNEYS _United States Patent Office_

3,289,601
Patented Dec. 6, 1966

3,289,601
FLUID DISPLACEMENT DEVICE USABLE AS A HYDRAULIC MOTOR OR PUMP
James A. Compton, South Euclid, Ohio, assignor to Fawick Corporation, a corporation of Michigan
Filed Feb. 12, 1965, Ser. No. 432,166
20 Claims. (Cl. 103—130)

This invention relates to a fluid displacement device suitable for use either as a hydraulic motor or as a pump.

Various fluid displacement devices have been proposed heretofore which comprise an outside ring gear having an annular series of internal gear teeth and an inside gear with a smaller number of external gear teeth which is mounted within the outside gear to revolve in a circular orbit about the axis of the outside gear, one of the gears being rotatable on its own axis as the inside gear revolves orbitally. Two separated fluid-tight pockets or chambers are provided between the gears for respectively receiving and discharging hydraulic liquid. In one type of such devices, the gears have rounded teeth and they operate on the well-known Gerotor principle, with the teeth on the respective gears sealingly engaging one another to define the two fluid-tight pockets between the gears. In a second type, the teeth on the respective gears sealingly engage each other at one point and a generally crescent-shaped piece is sealingly disposed between the gears at the opposite side from where their gear teeth are in sealing engagement with each other, so that each of the fluid-tight pockets or chambers is closed at one end by the sealing engagement between the gear teeth and at the opposite end by the crescent-shaped piece. In both types of such devices, the orbital movement of the inside gear moves the two fluid-tight pockets progressively around the toothed inside periphery of the outside gear as relative rotation between the gears takes place.

Such fluid displacement devices, when operated as motors with the outside gear held stationary and the inside gear rotatable on its own axis, have the inherent advantage of providing a gear reduction because the inside gear's speed of rotation on its own axis is only a fraction of the speed at which it revolves orbitally about the axis of the outside gear. Consequently, the inside gear rotates on its own axis at low speed and high torque. Conversely, when such a fluid displacement device is operated as a pump it inherently provides a step-up gearing between its input shaft and the pump rotor.

One of the difficulties associated with such fluid displacement devices, however, has been the absence of a simple, compact and effective arrangement for imparting the slow rotation of the inside gear on its own axis to a rotary output shaft when the device operates as a motor, or vice versa when the device operates as a pump. One aspect of the present invention is directed to the solution of this difficulty.

Another disadvantage of such fluid displacement devices has been the relatively complex valving arrangements provided on them for controlling the admission and discharge of hydraulic liquid to and from the fluid-tight pockets or chambers between the gears in synchronism with the orbital movement of the inside gear. The present invention is directed to a novel and improved arrangement in such a fluid displacement device for controlling the flow of hydraulic liquid to and from the pockets between the gears. By virtue of the simplicity of this arrangement, the entire motor or pump can be more compact in size and lighter in weight for a given flow capacity.

Another disadvantage has been the lack of an effective arrangement for counterbalancing the inside gear as it revolves orbitally.

It is a principal object of this invention to provide a novel and improved fluid displacement device usable as a hydraulic motor or as a pump.

Another object of this invention is to provide such a device in which a rotatable and orbitally revolving inside gear has a novel coupling to a rotary shaft to provide a gear reduction when the device is operated as a motor or a step-up gearing when the device is operated as a pump.

It is also an object of this invention to provide a gear-type fluid displacement device having a novel and improved arrangement for controlling the flow of fluid to and from the fluid displacement pockets between the gears therein.

Another object of this invention is to provide in such a fluid displacement device a novel means for counter-balancing the orbitally revolving inside gear.

Another object of this invention is to provide such a fluid displacement device having a novel arrangement for minimizing fluid leakage therein.

Another object of this invention is to provide in such a fluid displacement device a novel porting plate for counterbalancing the orbitally revolving inside gear and also for passing liquid to and from the pockets between the gears.

Further objects and advantages of this invention will be apparent from the following detailed description of two presently-preferred embodiments thereof, which are illustrated in the accompanying drawings.

In the drawings:

FIGURE 1 is a top plan view of a hydraulic motor or pump in accordance with a first embodiment of the present invention;

FIGURE 2 is a vertical axial section through the motor or pump of FIG. 1, taken along the line 2—2 in FIG. 1;

FIGURE 3 is a cross-section through the cooperating gears in this motor or pump, taken along the line 3—3 in FIG. 2;

FIGURE 4 is a cross-section taken along the line 4—4 in FIG. 2 at the inner face of the porting plate in this motor or pump;

FIGURE 5 is a view similar to FIG. 4, showing the inner face of the porting plate in full lines and the gears superimposed in dotted lines to show the porting of hydraulic liquid into and out of the pump or motor;

FIGURE 6 is a perspective view of the Oldham coupling member connected between the inside gear and the shaft of the motor or pump of FIGS. 1–5;

FIGURE 7 is an axial section through a hydraulic motor or pump in accordance with a second embodiment of the present invention;

FIGURE 8 is a cross-section taken along the line 8—8 in FIG. 7 and showing in end elevation the cooperating gears of the motor or pump;

FIGURE 9 is an elevational view showing in full lines the inner face of the porting plate in this motor or pump and with the gears superimposed in dotted lines; and FIGURE 10 is a perspective view of the porting plate in this motor or pump, viewed from its axially inner end.

Referring first to FIGS. 1 and 2, and considering the pressure fluid displacement device shown therein as a hydraulic motor, the motor comprises a flanged stationary housing member 15 which rotatably receives the rotary output shaft 16 of the motor. As shown in FIG. 2, this shaft is rotatably supported by a sleeve bearing 17 inside the housing member 15. Housing member 15 carries an O-ring seal 18 and an additional annular seal 19, both of rubber or rubber-like material, which sealingly engage the output shaft 16 beyond the outer end of bearing 17.

At its inner end, housing member 15 has an integral, outwardly extending annular flange 20. An annular, internally toothed, outside gear 21 abuts axially against this flange and constitutes another part of the motor housing. A still further housing member 22 abuts against the opposite axial end of the outside gear 21. Housing members 15 and 22 carry respective O-ring seals 23 and 24 which sealingly engage the opposite end faces of the outside gear 21. A plurality of bolts 25 clamp the housing parts together in tightly abutting, end-to-end relationship.

Referring to FIG. 3, the outside gear 21 is formed with an annularly arranged series of internal gear teeth 26 of suitable involute profile. Cooperating with these internal gear teeth are an annular series of external teeth 27 on an inside gear 28, which is rotatably mounted eccentrically within the outside gear 21. The outside gear 21 is stationary, while the inside gear 28 is mounted for rotation on its own axis and also for orbital movement inside the outside gear, with the axis of the inside gear 28 revolving in a circular path about the central axis of the stationary outside gear 21. The inside gear 28 has fewer teeth than the outside gear 21. In the particular embodiment shown, the inside gear has 14 teeth and the outside gear has 17 teeth. It is to be understood, however, that these are just typical examples and the present invention is not limited to these particular examples.

A generally crescent-shaped arcuate piece 29 sealingly engages the outside of certain of the teeth 27 on the inside gear 28 and the inside of the nearby teeth 26 on the outside gear 21 at a location diametrically opposite where the teeth on the two gears are in full meshing and sealing engagement with each other. To the left of this crescent piece 29 in FIG. 3, the cooperating teeth and lobes on the gears define spaces 30 for receiving fluid under pressure from an inlet passage, these spaces being of progressively increasing size from the fully meshing teeth of the gears down to the left end of the crescent piece 29. These spaces 30 together provide a fluid pocket or chamber between the gears. The outside periphery of the inside gear 28 and the inside periphery of the outside gear 21 provide the inner and outer sides of this pocket.

To the right of the crescent 29 in FIG. 3, the cooperating teeth and lobes on the two gears define spaces 31. These spaces 31 are of progressively decreasing size from the right end of crescent piece 29 up to the fully meshing teeth of the gears. These spaces 31 together provide a second fluid pocket or chamber between the gears which is sealed at one end by the fully meshing gear teeth and at the opposite end by the crescent 29. The outside periphery of the inside gear 28 and the inside periphery of the outside gear 21 provide the inner and outer sides of this pocket.

In accordance with this embodiment of the present invention, the crescent 29 is attached to a porting plate 32 (FIGS. 2 and 4) which controls the flow of fluid to and from the two pockets between the teeth of the cooperating gears. As shown in FIG. 2, this porting plate has a flat face 33 at its axially inner end which abuts against the left end face of the outside gear 21 and has a running clearance with the left end face of the inside gear 28, and the crescent piece 29 projects axially from this end face into the space between the gears. As shown in FIGS. 4 and 5, this inner end face 33 of the porting plate has an elongated arcuate port 34 through which inlet fluid under pressure is discharged into the spaces 30 between the gears at the one side of the crescent 29. At the opposite side of the crescent, the porting plate has an elongated arcuate slot 35 in its periphery which communicates with the spaces 31 between the gears. This relationship between the porting plate and the gears is shown in FIG. 5, where the gears appear in dotted lines, the inside face of the porting plate appears in full lines, and the spaces 30 and 31 between the gears which register with the openings 34 and 35 in the porting plate are shaded.

Except at its peripheral slot 35, the inner face 33 of the porting plate has a circular periphery 46 (FIG. 4) which is concentric about the axis of the stationary outside gear member 21. As shown in FIG. 2, this circular periphery of the porting plate has a running fit inside a circular recess 47 at the inside face of housing member 22. This enables the porting plate to rotate about the axis of the outside gear member 21.

The porting plate 32 has a recess 36 at its inside face which rotatably receives an axially projecting shaft 37 integral with the inside gear 28. Shaft 37 is concentric with the inside gear 28 and therefore is eccentric to the outside gear 21. Recess 36 in the porting plate 32 is eccentric to the axis of the outside gear 21 by the same amount as shaft 37 on the inside gear 28. With this arrangement, the inside gear 28 is free to rotate on its own axis with respect to the porting plate 32, but the orbital movement of the inside gear 28 in a circle about the axis of the outside gear 21 is imparted to the porting plate 32. Consequently, the inlet port 34, the crescent piece 29 and the outlet slot 35 on the porting plate turn about the axis of the outside gear 21 in unison with the inside gear's orbital movement about the axis of the outside gear.

As shown in FIG. 2, the arcuate inlet port 34 at the inside face 33 of the porting plate is at the inner end of a diagonal inlet passage 38 extending through the porting plate. The opposite end of passage 38 is open at a flat outer end face 39 of the porting plate. The housing member 22 has a fluid inlet port 40 (FIG. 1) which communicates with this outer end face 39 of the porting plate through a passage 41 (FIG. 2). A seal ring 42 of bronze or other suitable material is urged by a compression spring 43 against the outer end face 39 of the porting plate. This seal ring carries an O-ring 44 of rubber-like material which sealingly engages an internal annular wall 45 of housing member 22. The internal diameter of ring 42 is sufficiently large that the outer end of the inlet passage 38 in the porting plate 32 will be inside the ring, and therefore in fluid communication with the inlet passage 41, in all rotational positions of the porting plate. The seal ring 42 is substantially coaxial with the recess 47 at the inside face of housing member 22.

This recess 47 communicates with an annular passage 48 (FIG. 2) in housing member 22 leading to a discharge port 49 (FIG. 1). As shown in FIG. 2, the porting plate 32 has a frusto-conical peripheral edge 50 behind its inside peripheral edge 46, and this edge 50 has a sufficient clearance from the inside of housing member 22 to provide this fluid communication between housing recess 47 and housing passage 48. With this arrangement, the fluid in the spaces 31 between the teeth of the cooperating gears is free to flow through the peripheral slot 35 at the inside face of the porting plate 32 and around the frusto-conical peripheral edge 50 of the porting plate to the housing passage 48 and from there to the discharge port 49. Accordingly, this peripheral slot 35 constitutes a second fluid passage in the porting plate.

In accordance with the present invention, the rotation of the inside gear 28 on its own axis is imparted to shaft 16 through an Oldham coupling, which provides a rugged, simple and compact connection between them.

Referring to FIG. 2, the inside gear 28 has an integral axial projection 51 which is elongated along one diameter of gear 28 and is snugly, but slidably, received in a longer diametral slot 52 in one end of an Oldham coupling member 53 (FIG. 6). Coupling member 53 at its opposite end has an axial projection 54, which is elongated along another diameter perpendicular to the length of projection 51 and slot 52. This projection 54 is snugly but slidably, received in cooperating diametrically extending slot 55 in the inner end of the output shaft 16. This Oldham coupling imparts the rotation of the inside gear 28 on its own axis to the output shaft 16 when the fluid displacement device operates as a hydraulic motor. When the device operates as a pump it imparts the rotation of shaft 16 to the inside gear. It will be noted that this coupling is entirely within the bore in housing member 15.

The inside gear 28 has an axial passage 56 therethrough which communicates with a diagonal passage 57 in the porting plate 32 leading to the annular discharge passage 48 in housing member 22.

As already stated, the porting plate 32 turns about the axis of the outside gear 21 in unison with the revolving of the inside gear 28 orbitally about the axis of the outside gear 21. The mass of the orbitally revolving gear 28, which at any instant is off-center with respect to the rotational axis of the assembly 32, 28 (i.e., the axis of the outside gear), would tend to produce a significant unbalance of the rotor assembly 28, 32. In many hydraulic motors the unbalance of the rotor has produced excessive noise, wear and undesirable pulsations of the fluid output from the motor, as well as other disadvantages. In the present invention, however, any unbalance due to the mass of the inside gear 28 can be offset by providing a counterbalance weight 60 (FIG. 2) eccentrically attached to the outside face 39 of the porting plate 32 which revolves with the inside gear. Alternatively, this counterbalancing can be provided by removing sufficient material of the porting plate 32 at an off-center location thereon so that the assembly of the porting plate 32 and the inside gear 28, as a unit, will be substantially balanced statically and dynamically.

In the operation of this motor, the pressurized inlet fluid flows through the housing inlet port 40 and inlet passage 41 to the outer end face 39 of porting plate 32. From here, the fluid flows through the inlet passage 38 in the porting plate to the port 34 at the inner end face 33 of the porting plate into the spaces 30 (FIGS. 3 and 5) between the cooperating gears 21 and 28. The pressure of this fluid causes the inside gear 28 to rotate on its own axis clockwise in FIGS. 3 and 5 and to revolve counterclockwise orbitally about the axis of the stationary outside gear 21. In the example shown in FIGS. 1–6, in revolving orbitally through one full turn about the axis of the outside gear 21, the inside gear rotates only 6/7 of a turn on its own axis. The output shaft 16 rotates in unison with the rotation of the inside gear 28 on its own axis by virtue of the Oldham coupling 51–55 between them. The porting plate 32 turns in unison with the high speed orbital revolving of the inside gear 28 about the axis of the outside gear 21, so that the inlet port 34 in the porting plate keeps the same relationship with respect to the fluid inlet spaces 30 at one side of crescent 29, and the outlet passage 35 in the periphery of the porting plate keeps the same relationship with respect to the outlet spaces 31 between the gears at the opposite side of the crescent. Fluid from the outlet spaces 31 between the cooperating gears is discharged through the peripheral slot 35 at the inside end face of the porting plate and around the tapered edge 50 of the porting plate to the housing discharge passage 48 and from there to the discharge port 49.

The cooperating gears inherently provide a gear reduction in which several revolutions of the inside gear 28 orbitally about the axis of the outside gear 21 are required in order to produce each single rotation of the inside gear 28 on its own axis.

The spring 43 maintains the sealing ring 42 in sealing engagement with the outer end face 39 of the porting plate to prevent leakage across this face from the housing inlet passage 41 to the housing discharge passage 48. Also, spring 43 biases the porting plate 32 endwise against the gears 21 and 28.

The fluid pressure at the housing inlet passage also pressure loads the porting plate 32 endwise toward the gears 21 and 28 so as to maintain the inside face 33 of the porting plate 32 abutting against the left end face of the fixed outside gear 21 and to maintain this face of the porting plate at a minimum running clearance from the left end face of the inside gear 28 in FIG. 2. This fluid pressure loading is applied across a broad area of the outer end face 39 of the porting plate and is substantially evenly distributed across it with respect to the rotational axis of the porting plate, because sealing ring 42 is concentric with the housing recess 47 in which the porting plate turns, so that the fluid pressure thrust on the porting plate is substantially entirely applied in an axial direction. The same spring and hydraulic forces urge the inside gear into a close running fit with the housing flange 20.

Any internal leakage within the motor is passed to the sliding parts of the Oldham coupling to lubricate the latter and then is returned through the axial passage 56 in the inside gear 28 and passage 57 in the porting plate to the housing discharge passage 48. These return passages minimize the possibility of leakage along the output shaft 16 to the outside of housing member 15.

The fluid displacement device of FIGS. 1–6 also may be operated as a pump by making shaft 16 the rotary input shaft of the pump, port 49 the low pressure inlet port, and port 40 the high pressure outlet port. The same advantageous operating characteristics are obtained when the device is operated as a pump as when operated as a hydraulic motor.

FIGURES 7–10 illustrate a second embodiment of this invention which is basically similar to the embodiment of FIGS. 1–6, except that the cooperating gears operate on the well-known Gerotor principle and there is no crescent between the gears. The inside gear has one fewer teeth than the outside gear. Corresponding elements in FIGS. 7–10 are given the same reference numerals as in FIGS. 1–6, plus 100, and the detailed description of them will not be repeated.

In FIGS. 7–10 the outside gear 121 has 7 internal gear teeth 126 and the inside gear member 128 has 6 internal gear teeth 127. However, it is to be understood that these are intended as illustrative examples only, and not in a limiting sense.

This second embodiment differs from the first in that the inside gear is of two-piece construction composed of the inside gear member 128 and a coupling member 170 (FIG. 7) on which the gear member 128 is keyed. Coupling member 170 of the inside gear has at one end an axially projecting shaft 171, which is rotatably received in the recess 136 in the porting plate 132, and at its opposite end an axial projection 172 elongated along one diameter of the inside gear and snugly, but slidably, received in the slot 152 in the Oldham coupling member 153. The inside gear member 128 and coupling member 170 are keyed together to rotate in unison about the axis of the inside gear and also to revolve in unison orbitally about the axis of the outside gear 121.

The stationary outside gear 121 is provided with a V-shaped groove 161 (FIGS. 7 and 8) at its end face next to the inner end face 133 of the porting plate 132. This groove 161 extends close to, and parallel to, the internal tooth and lobe profile of the outside gear 121 around the complete extent of that profile, as shown in FIG. 8. Groove 161 communicates with the inner end of a short radial groove 162 in this same end face of the outside gear. The outer end of groove 162 communicates with a longitudinal passage 163 extending through the outside gear 121, as shown in FIG. 7. At this same end face of the outside gear, passage 163 registers with a longitudinal passage 164 in housing member 122 leading to the annular discharge passage 148 in the latter. At the opposite end face of the outside gear 121, the longitudinal passage 163 therein registers with a passage 165 in housing member 115, which leads to an annular recess 166 therein. A radial opening 167 in the sleeve bearing 117, which rotatably supports the output shaft 116, communicates with this recess 166.

The porting plate 132 has a radial passage 168 extending from its recess 136, which rotatably receives the axial shaft 171 on the coupling member 170 which is part of the inside gear 128, 170, out to the discharge passage 148 in housing member 122.

With this arrangement, the inside face 133 of the porting plate 132 is exposed to the low pressure discharge fluid where it overlaps the groove 161 in the contiguous end face of the outside gear 121. Also, the output shaft 116 and the sliding parts 172, 152, 154, 155 of the Oldham coupling are lubricated by this same low pressure discharge fluid by way of passages 163–167. Both of the opposite ends of the inside gear 128, 170 are exposed to this low pressure, also.

In the operation of this device as a hydraulic motor, the pressurized inlet fluid flows through the housing inlet passage 141 and through the inside of the seal ring 142 to the inlet passage 138 in the porting plate 132. From this passage, the inlet fluid flows out the elongated arcuate port 134 in the inside end face of the porting plate into the spaces 130 between the gear teeth 126 and 127 on the stationary outside gear 121 and the rotatable and orbitally movable inside gear member 128 at the left-hand side of the latter in FIGS. 8 and 9. At the right-hand side in these figures, the fluid in the spaces 131 between the cooperating gear teeth is discharged through the peripheral passage 135 in the inner end face of the porting plate and through the clearance between the tapered peripheral edge 150 of the porting plate and the inside of the housing member 122 to the latter's annular discharge passage 148, and from there to the outlet port 149.

In the specific embodiment shown in FIGS. 7–10, each revolution of the inside gear 128, 170 one full turn orbitally about the axis of the outside gear 121 will be accompanied by a rotation of the inside gear 128, 170 on its own axis through 1/7 of a turn in the opposite direction. This reduced speed rotation of the inside gear is imparted through the coupling member 170 and the Oldham coupling member 153 to the output shaft 116. At the same time the porting plate 132 turns about the axis of the outside gear 121 at the same high speed at which the inside gear 128, 170 is revolving orbitally about the axis of the outside gear. Consequently, the inlet port 134 in the porting plate keeps the same relationship with respect to the spaces 130 between the gear and the peripheral discharge passage 135 in the porting plate keeps the same relationship with respect to the spaces 131 between the gears.

The porting plate 132 is urged by the hydraulic force unbalance acting axially against it, and also by the force of spring 143 in the same direction, into engagement with the adjacent end face of the outside gear 121 and into a close running clearance with respect to the adjacent end face of the inside gear 128, 170. These same hydraulic and spring forces urge the inside gear axially into a close running fit with the end face of the flange 120 on housing member 115.

In order to counterbalance the revolving parts (the inside gear 128, 170 and the porting plate 132) of this assembly, the porting plate 132 may be provided with a suitably located counterweight 160 so that these revolving parts will be substantially balanced dynamically and statically. Alternatively, such counterbalancing may be achieved by removing material from the outer end face of the porting plate 132.

The fluid displacement device of FIGS. 7–10 may be operated as a pump by driving shaft 116 as the input shaft and making port 149 the low pressure fluid inlet port and passage 141 the higher pressure outlet passage.

While two presently-preferred embodiments of this invention have been described in detail and illustrated in the accompanying drawings, it is to be understood that the invention is susceptible of other embodiments incorporating various modifications, omissions and refinements which depart from the disclosed embodiments without departing from the spirit and scope of this invention.

I claim:

1. A fluid displacement device usable as a hydraulic motor or pump and comprising:
   a fixed outside gear having an annular series of internal gear teeth;
   means coacting with the outside gear to provide two fluid pockets circumferentially separated within the outside gear, said means including an inside gear eccentrically mounted within the outside gear and having a smaller number of external gear teeth for meshing engagement with the internal gear teeth on the outside gear and providing therewith the inner and outsides of said pockets, said inside gear being rotatable on its own axis and being revolvable orbitally about the axis of the outside gear to move said pockets circumferentially around the inside of said outside gear;
   means for passing hydraulic liquid to and from said pockets between the gears;
   a rotary shaft;
   and Oldham coupling means acting between the inside gear and the shaft for imparting rotation between them.

2. A fluid displacement device usable as a hydraulic motor or pump and comprising:
   a fixed outside gear having an annular series of internal gear teeth;
   means coacting with the outside gear to provide two fluid pockets circumferentially separated within the outside gear, said means including an inside gear eccentrically mounted within the outside gear and having a smaller number of external gear teeth for meshing engagement with the internal gear teeth on the outside gear and providing therewith the inner and outer sides of said pockets, said inside gear being rotatable on its own axis and being revolvable orbitally about the axis of the outside gear to move said pockets circumferentially around the inside of said outside gear;
   a porting plate coupled to the inside gear to turn in unison therewith about the axis of the outside gear, said porting plate having a pair of passages, each communicating with a respective one of said pockets in all orbital positions of the inside gear within the outside gear for respectively passing hydraulic liquid to and from said pockets;
   a rotary shaft;
   and Oldham coupling means connecting the inside gear to the shaft for imparting rotation from one to the other.

3. A fluid displacement device usable as a hydraulic motor or as a pump and comprising:
   housing means having an inner end wall and having a longitudinal bore therein extending to said end wall, a shaft rotatably mounted in said bore;
   a fixed outside gear abutting at one axial side thereof against said end wall, said outside gear having an annular series of internal gear teeth;
   means coacting with the outside gear to provide two fluid pockets circumferentially separated within the outside gear, said means including an inside gear eccentrically mounted within the outside gear and having a smaller number of external gear teeth for meshing engagement with the internal gear teeth on the outside gear and providing therewith the inner and outer sides of said pockets, said inside gear being rotatable on its own axis and being revolvable orbitally about the axis of the outside gear to move said pockets circumferentially around the inside of said outside gear;
   means at the opposite axial side of the gears for passing hydraulic liquid respectively to and from said pockets between the gears;
   and an Oldham coupling at said one axial side of the inside gear connecting said inside gear to the inner end of the shaft for imparting rotation between them, said Oldham coupling being disposed entirely within said bore.

4. A fluid displacement device usable as a hydraulic motor or as a pump and comprising:
   a first housing member having a flat annular inner end wall and having a longitudinal bore therein extending to said end wall, a shaft rotatably mounted in said bore;

a fixed outside gear abutting at one axial side thereof against said end wall, said outside gear having an annular series of internal gear teeth;

another housing member abutting against the opposite axial side of said outside gear;

means coacting with the outside gear to provide two fluid pockets circumferentially separated within the outside gear, said means including an inside gear eccentrically mounted within the outside gear and having a smaller number of external gear teeth for meshing engagement with the internal gear teeth on the outside gear and providing therewith the inner and outer sides of said pockets, said inside gear being rotatable on its own axis and being revolvable orbitally about the axis of the outside gear to move said pockets circumferentially around the inside of said outside gear;

said other housing member having a high pressure fluid passage and a low pressure fluid passage;

a porting plate rotatably mounted within said other housing member for rotation about the axis of the outside gear, said porting plate having an inner end face in confronting relationship to said opposite axial side of the outside gear and the corresponding side of the inside gear, means eccentric to the porting plate coupling the inside gear to the porting plate to cause the latter to turn about the axis of the outside gear in response to the orbital revolving of the inside gear, said porting plate having a first passage therein providing fluid communication between said high pressure fluid passage in said other housing member and one of said pockets between the gears in all orbital positions of the inside gear, said porting plate having a second passage providing fluid communication between the other of said pockets between the gears and said low pressure fluid passage in said other housing member in all orbital positions of the inside gear;

and an Oldham coupling connecting said inside gear to the inner end of the shaft for imparting rotation between them, said Oldham coupling being disposed entirely within said bore in said first housing member.

5. A fluid displacement device according to claim 4 and further comprising:

means for fluid pressure loading said porting plate axially inward to establish a close running clearance between its inner end face and said opposite axial side of the inside gear.

6. A fluid displacement device according to claim 5 wherein:

said porting plate counterbalances the inside gear as the latter revolves orbitally about the axis of the outside gear.

7. A fluid displacement device according to claim 5 and further comprising:

a sealing ring coaxial with said porting plate and positioned axially outward from the latter at said high pressure fluid passage in the first housing member;

and spring means urging said sealing ring into sealing engagement with the outer end face of the porting plate to separate said high and low pressure passages from each other;

said first passage in the porting plate being open inside said sealing ring to said high pressure fluid passage in said other housing member in all rotational positions of the porting plate.

8. A fluid displacement device according to claim 7 and further comprising:

passage means providing fluid communication between said low pressure fluid passage in said other housing member and said means coupling the inside gear to the porting plate and between said low pressure fluid passage and said Oldham coupling.

9. A fluid displacement device according to claim 7 and further comprising:

passage means providing fluid communication between said low pressure fluid passage in said other housing member and the inner end face of the porting plate.

10. A fluid displacement device according to claim 8 wherein:

said passage means comprises an additional passage in said porting plate extending from said low pressure fluid passage in said other housing member to said means coupling the inside gear to the porting plate, and a longitudinal passage through the inside gear extending from said last-mentioned coupling means to said Oldham coupling.

11. A fluid displacement device according to claim 9 wherein:

said last-mentioned passage means comprises a groove in said opposite axial side of the outside gear closely surrounding the latter's internal gear tooth profile.

12. A fluid displacement device usable as a hydraulic motor or pump and comprising:

a fixed outside gear having an annular series of internal gear teeth;

means coacting with the outside gear to provide two fluid pockets circumferentially separated within the outside gear, said means including an inside gear eccentrically mounted within the outside gear and having a smaller number of external gear teeth for meshing engagement with the internal gear teeth on the outside gear and providing therewith the inner and outer sides of said pockets, said inside gear being rotatable on its own axis and being revolvable orbitally about the axis of the outside gear to move said pockets circumferentially around the inside of said outside gear;

a porting plate at one axial side of said gears, said porting plate being coupled to said inside gear to turn in unison therewith about the axis of said outside gear, said porting plate having a pair of passages, each communicating with a respective one of said pockets in all orbital positions of the inside gear within the outside gear for respectively passing hydraulic liquid to and from said pockets;

a rotary shaft at the opposite axial side of said gears;

and coupling means acting between the inside gear and the shaft for imparting the rotation of the one to the other.

13. A fluid displacement device usable as a hydraulic motor or pump and comprising:

a fixed outside gear having an annular series of internal gear teeth;

means coacting with the outside gear to provide two fluid pockets circumferentially separated within the outside gear, said means including an inside gear eccentrically mounted within the outside gear and having a smaller number of external gear teeth for meshing engagement with the internal gear teeth on the outside gear and providing therewith the inner and outer sides of said pockets, said inside gear being rotatable on its own axis and being revolvable orbitally about the axis of the outside gear to move said pockets circumferentially around the inside of said outside gear;

housing means at one axial side of the gears having a high pressure fluid passage and a low pressure fluid passage;

a porting plate having an inner end face in confronting relationship to said one axial side of the gears and an outer end face exposed to the fluid pressure in said high pressure fluid passage, said porting plate being coupled to said inside gear to turn in unison therewith about the axis of the outside gear, said porting plate having first and second passages, said first passage connecting said high pressure fluid passage in said housing means to one of said pockets between the gears in all orbital positions of the inside gear within the outside gear, said second passage connecting said low pressure fluid passage in said housing means to the other of said pockets in all orbital positions of the inside gear within the outside gear;

a rotary shaft at the opposite axial side of said gears;

and coupling means acting between the inside gear and the shaft for imparting the rotation of the one to the other.

14. A fluid displacement device according to claim 13 wherein:

said first passage terminates at an elongated arcuate port at the inner end face of the porting plate;

and said second passage comprises an elongated slot in the periphery of the porting plate at its inner end face.

15. A fluid displacement device according to claim 13 and further comprising:

a sealing ring substantially coaxial with said porting plate and positioned axially outward from the latter at said high pressure fluid passage in said housing means;

and spring means urging said sealing ring into sealing engagement with the outer end face of the porting plate;

said sealing ring separating said high pressure and low pressure fluid passages in said housing means from each other;

said first passage in the porting plate being open inside said sealing ring to said high pressure fluid passage in said housing means in all rotational positions of the porting plate.

16. A fluid displacement device according to claim 15 and further comprising:

passage means providing fluid communication between said low pressure fluid passage in said housing means and said means coupling the inside gear to the porting plate and between said low pressure fluid passage and said coupling means acting between the inside gear and the shaft.

17. A fluid displacement device according to claim 15 and further comprising:

passage means providing fluid communication between said low pressure fluid passage in said housing means and the inner end face of the porting plate.

18. In a fluid displacement device usable as a hydraulic motor or pump, the combination of:

an outside gear having an annular series of internal gear teeth;

means coacting with the outside gear to provide two fluid pockets circumferentially separated within the outside gear, said means including an inside gear eccentrically mounted within the outside gear and having a smaller number of external gear teeth for meshing engagement with the internal gear teeth on the outside gear and providing therewith the inner and outer sides of said pockets, said inside gear being revolvable orbitally about the axis of the outside gear to move said pockets circumferentially around the inside of said outside gear, one of said gears being rotatable on its own axis as the inside gear revolves orbitally about the axis of the outside gear;

and means coupled to said inside gear for counterbalancing the latter as it revolves orbitally about the axis of the ouside gear.

19. In a fluid displacement device usable as a hydraulic motor or pump, the combination of:

an outside gear having an annular series of internal gear teeth;

means coacting with the outside gear to provide two fluid pockets circumferentially separated within the outside gear, said means including an inside gear eccentrically mounted within the outside gear and having a smaller number of external gear teeth for meshing engagement with the internal gear teeth on the outside gear and providing therewith the inner and outer sides of said pockets, said inside gear being revolvable orbitally about the axis of the outside gear to move said pockets circumferentially around the inside of said outside gear, one of said gears being rotatable on its own axis as the inside gear revolves orbitally about the axis of the outside gear;

a rotary shaft;

means acting between the rotatable gear and the shaft for imparting rotation between them;

and means rotatable about the axis of the outside gear and coupled eccentrically to the inside gear to be turned thereby as the latter revolves orbitally, said last-mentioned means counterbalancing the inside gear as the latter revolves orbitally.

20. A fluid displacement device usable as a hydraulic motor or pump and comprising:

a fixed outside gear having an annular series of internal gear teeth;

means coacting with the outside gear to provide two fluid pockets circumferentially separated within the outside gear, said means including an inside gear eccentrically mounted within the outside gear and having a smaller number of external gear teeth for meshing engagement with the internal gear teeth on the outside gear and providing therewith the inner and outer sides of said pockets, said inside gear being rotatable on its own axis and being revolvable orbitally about the axis of the outside gear to move said pockets circumferentially around the inside of said outside gear;

a porting plate rotatable about the axis of the outside gear and coupled to said inside gear at a location eccentric to the axis of the outside gear so that the orbital revolving of the inside gear causes the porting plate to rotate, said porting plate having a pair of passages, each communicating with a respective one of said pockets in all orbital positions of the inside gear within the outside gear for respectively passing hydraulic liquid to and from said pockets, said porting plate having provision for counterbalancing the inside gear as the latter revolves orbitally about the axis of the outside gear;

a rotary shaft;

and means coupling the inside gear to the shaft for imparting rotation from one to the other.

References Cited by the Examiner

UNITED STATES PATENTS

| | | | |
|---|---|---|---|
| Re. 25,291 | 12/1962 | Charlson | 91—56 |
| 553,086 | 1/1896 | Wheildon | 91—56 |
| 1,389,189 | 8/1921 | Feuerheerd | 103—130 |
| 1,689,587 | 10/1928 | Holmes | 103—126 |
| 1,802,887 | 4/1931 | Feyens | 230—145 |
| 2,132,812 | 10/1938 | Wahlmark | 103—130 |
| 2,787,963 | 4/1957 | Dolan et al. | 103—126 |
| 2,871,831 | 2/1959 | Patin | 103—130 |
| 3,087,436 | 4/1963 | Dettlof et al. | 103—130 |

FOREIGN PATENTS 786,966  11/1957  Great Britain.

MARK NEWMAN, *Primary Examiner.*

W. J. GOODLIN, *Assistant Examiner.*